(12) United States Patent
Xu

(10) Patent No.: US 12,004,261 B2
(45) Date of Patent: Jun. 4, 2024

(54) METHOD AND ENTITY FOR CHECKING PORT CONSISTENCY OF NIDD MESSAGE

(71) Applicant: Telefonaktiebolaget LM Ericsson (publ), Stockholm (SE)

(72) Inventor: Wenliang Xu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/763,581

(22) PCT Filed: Sep. 24, 2020

(86) PCT No.: PCT/CN2020/117492
§ 371 (c)(1),
(2) Date: Mar. 24, 2022

(87) PCT Pub. No.: WO2021/057856
PCT Pub. Date: Apr. 1, 2021

(65) Prior Publication Data
US 2022/0295268 A1   Sep. 15, 2022

(30) Foreign Application Priority Data
Sep. 27, 2019   (WO) ................ PCT/CN2019/108567

(51) Int. Cl.
*H04L 69/22*    (2022.01)
*H04L 47/80*    (2022.01)
*H04W 8/26*     (2009.01)

(52) U.S. Cl.
CPC ............. *H04W 8/26* (2013.01); *H04L 47/803* (2013.01); *H04L 47/808* (2013.01); *H04L 69/22* (2013.01)

(58) Field of Classification Search
None
See application file for complete search history.

(56) References Cited

U.S. PATENT DOCUMENTS

2015/0032691 A1* 1/2015 Hall .................... H04L 47/2483
                                                      707/610
2018/0368202 A1* 12/2018 Landais ................ H04W 48/12
(Continued)

FOREIGN PATENT DOCUMENTS

WO   2017167603 A1   10/2017
WO   2018/144249 A1   8/2018

OTHER PUBLICATIONS

ETSI TS 129 122 V15.4.0 (Jul. 2019), Technical Specification, Universal Mobile Telecommunications System (UMTS); LTE; 5G; T8 reference point for Northbound APIs (3GPP TS 29.122 version 15.4.0 Release 15), Jul. 2019 (308 pages).
(Continued)

*Primary Examiner* — James A Edwards
(74) *Attorney, Agent, or Firm* — Rothwell, Figg, Ernst & Manbeck, P.C.

(57) ABSTRACT

Embodiments of the present disclosure provide a method and an entity for checking port consistency of NIDD message. A first aspect of the present disclosure provides a method performed at a first entity (100), comprising: receiving (S101), from a second entity, a non-internet protocol data delivery, NIDD, message including one or more RDS port numbers; and determining (S102) whether the one or more RDS port numbers are within a configured RDS port list. According to embodiments of the present disclosure, network resources for transmitting the invalid NIDD data may be saved, and undesired actions in the communication system may be avoided.

23 Claims, 11 Drawing Sheets

| Format | \multicolumn{8}{c}{Address and Control Field Bits} | Octet |
|--------|---|---|---|---|---|---|---|---|---|
|  | 8 | 7 | 6 | 5 | 4 | 3 | 2 | 1 |  |
| I Format | PD | 0 | A | X | ADS | \multicolumn{3}{c}{N(S)} | 1 |
|  | \multicolumn{3}{c}{N(R)} | R1 | R2 | R3 | S1 | S2 | 2 |
|  | \multicolumn{4}{c}{Source Port} | \multicolumn{4}{c}{Destination Port} | 3 |
| S Format | PD | 1 | 1 | 0 | ADS | A | X | X | 1 |
|  | \multicolumn{3}{c}{N(R)} | R1 | R2 | R3 | S1 | S2 | 2 |
|  | \multicolumn{4}{c}{Source Port} | \multicolumn{4}{c}{Destination Port} | 3 |
| UI Format | PD | 1 | 0 | X | ADS | \multicolumn{3}{c}{N(U)} | 1 |
|  | \multicolumn{4}{c}{Source Port} | \multicolumn{4}{c}{Destination Port} | 2 |
| U Format | PD | 1 | 1 | 1 | ADS | CR | X | X | 1 |
|  | X | X | X | X | M4 | M3 | M2 | M1 | 2 |
|  | \multicolumn{4}{c}{Source Port} | \multicolumn{4}{c}{Destination Port} | 3 |

(56) References Cited

U.S. PATENT DOCUMENTS

| | | | |
|---|---|---|---|
| 2019/0028337 A1* | 1/2019 | Ryu | H04W 8/02 |
| 2019/0261453 A1* | 8/2019 | Jain | H04W 8/08 |
| 2021/0037584 A1* | 2/2021 | Abbasi | H04W 76/15 |

OTHER PUBLICATIONS

Telstra, "Lawful Interception for Non-IP Data Delivery (NIDD) using SCEF," 3GPP TSG-SA WG3-LI Meeting #72bis Dusseldorf, Germany, Feb. 26-28, 2019 (Tdoc s3i190126) (45 pages).
Qualcomm Incorporated et al., "Adding port discovery to RDS", 3GPP TSG CT WG1 Meeting #114, C1-190291, Bratislava, Slovakia, Jan. 21-25, 2019 (5 pages).
International Search Report and Written Opinion dated Nov. 6, 2020 in International Application No. PCT/CN2020/117492 (8 pages).
Ericsson, "RDS port mismatch in NIDD", 3GPP TSG-CT WG3 Meeting #106, C3-194414, Oct. 11, 2019, section 4.4.5.3.1 (8 pages).
Ericsson, "RDS port mismatch in NIDD", 3GPP TSG-CT WG3 Meeting #106, C3-194303, Oct. 11, 2019, section 4.4.5.3.1 (8 pages).
Ericsson, "RDS port mismatch in NIDD", 3GPP TSG-CT WG3 Meeting #106, C3-194089, Oct. 11, 2019, section 4.4.5.3.1 (8 pages).
Convida Wireless et al., "Discussion on Reliable Data Service Port Numbers", SA WG2 Meeting #121, S2-173085, May 19, 2017 (2 pages).
3GPP TS 23.501 V16.0.0 (Mar. 2019), 3rd Generation Partnership Project; Technical Specification Group Services and System Aspects; System Architecture for the 5G System; Stage 2 (Release 16) (318 pages).
3GPP TS 23.502 V16.0.0 (Mar. 2019), 3rd Generation Partnership Project; Technical Specification Group Services and System Aspects; Procedures for the 5G System; Stage 2 (Release 16) (420 pages).
3GPP TS 29.122 V16.0.0 (Dec. 2018), 3rd Generation Partnership Project; Technical Specification Group Core Network and Terminals; T8 reference point for Northbound APIs; (Release 16) (298 pages).
3GPP TS 29.522 V16.0.0 (Jun. 2019), 3rd Generation Partnership Project; Technical Specification Group Core Network and Terminals; 5G System; Network Exposure Function Northbound APIs; Stage 3 (Release 16) (43 pages).

* cited by examiner

| Format | \multicolumn{7}{c}{Address and Control Field Bits} | Octet |
| --- | --- | --- | --- | --- | --- | --- | --- | --- |
| | 8 | 7 | 6 | 5 | 4 | 3 | 2 | 1 | |
| I Format | PD | 0 | A | X | ADS | \multicolumn{3}{c}{N(S)} | 1 |
| | \multicolumn{3}{c}{N(R)} | R1 | R2 | R3 | S1 | S2 | 2 |
| | \multicolumn{4}{c}{Source Port} | \multicolumn{4}{c}{Destination Port} | 3 |
| | | | | | | | | | |
| S Format | PD | 1 | 1 | 0 | ADS | A | X | X | 1 |
| | \multicolumn{3}{c}{N(R)} | R1 | R2 | R3 | S1 | S2 | 2 |
| | \multicolumn{4}{c}{Source Port} | \multicolumn{4}{c}{Destination Port} | 3 |
| | | | | | | | | | |
| UI Format | PD | 1 | 0 | X | ADS | \multicolumn{3}{c}{N(U)} | 1 |
| | \multicolumn{4}{c}{Source Port} | \multicolumn{4}{c}{Destination Port} | 2 |
| | | | | | | | | | |
| U Format | PD | 1 | 1 | 1 | ADS | CR | X | X | 1 |
| | X | X | X | X | M4 | M3 | M2 | M1 | 2 |
| | \multicolumn{4}{c}{Source Port} | \multicolumn{4}{c}{Destination Port} | 3 |

FIG. 3

METHOD AND ENTITY FOR CHECKING PORT CONSISTENCY OF NIDD MESSAGE

CROSS REFERENCE TO RELATED APPLICATION(S)

This application is a 35 U.S.C. § 371 National Stage of International Patent Application No. PCT/CN2020/117492, filed Sep. 24, 2020, which claims priority to PCT/CN2019/108567, filed Sep. 27, 2019. The above-identified applications are incorporated by this reference.

TECHNICAL FIELD

The present disclosure relates generally to the technology of communication system, and in particular, to a method and an entity for checking a port consistency of a non-internet protocol data delivery, NIDD, message.

BACKGROUND

This section introduces aspects that may facilitate better understanding of the present disclosure. Accordingly, the statements of this section are to be read in this light and are not to be understood as admissions about what is in the prior art or what is not in the prior art.

In communication systems, functions for non-internet protocol data delivery, NIDD, may be used to handle mobile originated (MO) and mobile terminated (MT) communication with user equipment, UE, where the data used for the communication is considered unstructured (also referred as Non-IP) from the Evolved Packet System, EPS, standpoint.

For example, in a fourth generation, 4G, communication system, an association between a Service Capability Server/Application Server, SCS/AS, and a Public Data Network, PDN, Connection to a Service Capability Exposure Function, SCEF, needs to be established to enable transfer of non-IP data between the user equipment, UE, and the SCS/AS. When a Reliable Data Service is not enabled, the SCEF determines the association based on provisioned policies that may be used to map an SCS/AS identity and User identity to an access point name, APN. When the Reliable Data Service is enabled, the SCEF determines the association based on port numbers and provisioned policies that may be used to map SCS/AS identities and User identity to an APN (see 3rd generation partnership project technical specification, 3GPP TS 23.682, V16.4.0, clause 4.5.14.3).

When more than one SCS/AS is associated with the same PDN Connection, it is permissible for packets to or from one port number to be associated with more than one SCS/AS. Also, any polices that are applied to the PDN Connection (e.g. APN Rate Control), may be applied to traffic from all of the SCS/ASes that are associated with the PDN Connection.

The reliable data service, RDS, may be used to allow data transfer of multiple SCS/ASes (i.e. multiple applications) using the same non-IP PDN connection.

Further, the Reliable Data Service may be used by the user equipment, UE, and SCEF or packet data network gateway, P-GW, when using PDN Connection of PDN Type 'Non-IP'. The service provides a mechanism for the SCEF or P-GW to determine if the data was successfully delivered to the UE and for UE to determine if the data was successfully delivered to the SCEF. When a requested acknowledgement is not received, the Reliable Data Service retransmits the packet. The service is enabled or disabled based on APN Configuration per Service-Level Agreement, SLA.

When the service is enabled, a protocol is used between the end-points of the Non-IP PDN Connection. The protocol uses a packet header to identify if the packet requires no acknowledgement, requires an acknowledgement, or is an acknowledgment and to allow detection and elimination of duplicate PDUs at the receiving endpoint. Reliable Data Service supports both single and multiple applications within the UE. Port Numbers in the header are used to identify the application on the originator and to identify the application on the receiver. The UE, the SCEF and the P-GW may support reservation of the source and the destination port numbers for their use and subsequent release of the reserved port numbers. Reliable Data Service protocol (as defined in 3GPP TS 24.250, V16.1.0) also enables applications to query their peer entities to determine which port numbers are reserved and which are available for use at any given time.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The static RDS port information is currently sent via NIDD configuration to SCEF, or etc. Then, MO/MT non-IP data including any of this RDS port information are transferred by the SCEF. However, the SCEF will directly transfer any MO/MT non-IP data, including these NIDD messages with mismatched port number. Namely, a waste of communication resources as well as undesired actions in the communication network will occur due to meaningless message including mismatched port number.

Certain aspects of the present disclosure and their embodiments may provide solutions to these or other challenges. There are, proposed herein, various embodiments which address one or more of the issues disclosed herein. Namely, according to embodiments of the present disclosure, network resources for transmitting the invalid NIDD data may be saved, and undesired actions in the communication system may be avoided.

A first aspect of the present disclosure provides a method performed at a first entity, comprising: receiving, from a second entity, a non-internet protocol data delivery, NIDD, message including one or more RDS port numbers; and determining whether the one or more RDS port numbers are within a configured RDS port list.

In embodiments of the present disclosure, the one or more RDS port numbers comprise a source port number and a destination port number. Determining whether the one or more RDS port numbers are within a configured RDS port list may comprise: determining whether the source port number in the NIDD message equals to a configured source port number in the configured RDS port list; and/or determining whether the destination port number in the NIDD message equals to a configured destination port number in the configured RDS port list.

In embodiments of the present disclosure, the method further comprises: discarding the NIDD message, if it is determined that the one or more RDS port numbers are not within the Configured RDS port list.

In embodiments of the present disclosure, the method further comprises: transmitting a response message including an indication of that a port number is not consistent, if it is determined that the one or more RDS port numbers are not within the configured RDS port list.

In embodiments of the present disclosure, the indication of that the port number is not consistent may comprise an error code, and a value of the port number in the NIDD message.

In embodiments of the present disclosure, the response message is transmitted to a Service Capability Server/Application Server, SCS/AS, or an Application Function, AF; and the response message comprises at least one of: a Mobile Terminated, MT, NIDD submit Response message; a Group MT NIDD submit Response message; a NIDD Authorization Notification Request message; or a Mobile Originated, MO, NIDD Indication message.

In embodiments of the present disclosure, the method further comprises: receiving an updated configured RDS port list from the SCS/AS or the AF, after transmitting the response message including the indication of that the port number is not consistent; or receiving an updated NIDD message from the SCS/AS or the AF, after transmitting the response message including the indication of that the port number is not consistent.

In embodiments of the present disclosure, the first entity determines whether the one or more RDS port numbers are within a configured RDS port list, if an RDS port verification feature is supported.

In embodiments of the present disclosure, the first entity comprises a Service Capability Exposure Function, SCEF, or a Network Exposure Function, NEF; and the second entity comprises a SCS/AS or an AF, or a terminal device.

A second aspect of the present disclosure provides a method performed at a second entity, comprising: transmitting, to a first entity, a NIDD message including one or more RDS port numbers. The first entity determines whether the one or more RDS port numbers are within a configured RDS port list.

In embodiments of the present disclosure, the one or more RDS port numbers comprise a source port number and a destination port number. When the first entity determines whether the one or more RDS port numbers are within a configured RDS port list, the first entity determines: whether the source port number in the NIDD message equals to a configured source port number in the configured RDS port list; and/or whether the destination port number in the NIDD message equals to a configured destination port number in the configured RDS port list.

In embodiments of the present disclosure, the NIDD message is discarded by the first entity, if it is determined that the one or more RDS port numbers are not within the configured RDS port list.

In embodiments of the present disclosure, the method further comprises: receiving, from the first entity, a response message including an indication of that a port number is not consistent, if it is determined that the one or more RDS port numbers are not within the Configured RDS port list.

In embodiments of the present disclosure, the indication of that the port number is not consistent may comprise an error code, and a value of the port number in the NIDD message.

In embodiments of the present disclosure, the second entity comprises a SCS/AS, or an AF; and the response message comprises at least one of: a MT NIDD submit Response message; a Group MT NIDD submit Response message; a NIDD Authorisation Notification Request message; or a MO NIDD Indication message.

In embodiments of the present disclosure, the method further comprises: transmitting, to the first entity, an updated configured RDS port list, after receiving the response message including the indication of that the port number is not consistent; or transmitting, to the first entity, an updated NIDD message, after receiving the response message including the indication of that the port number is not consistent.

In embodiments of the present disclosure, the second entity comprises a terminal device.

In embodiments of the present disclosure, the first entity determines whether the one or more RDS port numbers are within a configured RDS port list, if an RDS port verification feature is supported.

In embodiments of the present disclosure, the first entity comprises a SCEF, or a NEF.

A third aspect of the present disclosure provides an apparatus for a first entity, comprising: a processor; and a memory, containing instructions executable by the processor. The first entity is operative to: receive, from a second entity, a NIDD message including one or more RDS port numbers; and determine whether the one or more RDS port numbers are within a configured RDS port list.

In embodiments of the present disclosure, the first entity is further operative to implement any of the methods above mentioned.

A fourth aspect of the present disclosure provides an apparatus for a second entity, comprising: a processor; and a memory, containing instructions executable by the processor. The second entity is operative to: transmit, to a first entity, a NIDD message including one or more RDS port numbers. The first entity determines whether the one or more RDS port numbers are within a configured RDS port list.

In embodiments of the present disclosure, the second entity is further operative to implement any of the methods above mentioned.

A fifth aspect of the present disclosure provides an apparatus for a first entity, comprising: a reception unit, configured to receive, from a second entity, a NIDD message including one or more RDS port numbers; and a determination unit, configured to determine whether the one or more RDS port numbers are within a configured RDS port list.

In embodiments of the present disclosure, the first entity is further operative to implement any of the methods above mentioned.

A sixth aspect of the present disclosure provides an apparatus for a second entity, comprising: a transmission unit, configured to transmit, to a first entity, a NIDD message including one or more RDS port numbers. The first entity determines whether the one or more RDS port numbers are within a configured RDS port list.

In embodiments of the present disclosure, the second entity is further operative to implement any of the methods above mentioned.

A seventh aspect of the present disclosure provides a computer readable storage medium having a computer program stored thereon, wherein the computer program is executable by an apparatus to cause the apparatus to carry out any of the methods.

According to some embodiments of the present disclosure, the port consistency of NIDD message may be checked. Thus, network resources for transmitting the invalid NIDD data may be saved, and undesired actions in the communication system may be avoided.

Further, according to some embodiments of the present disclosure, NIDD service for the SCS/AS or AF may be improved (i.e. the 3GPP network is able to notify abnormal situation to SCS/AS, or AF).

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 3 is an exemplary diagram showing address and control field format for a NIDD message.

DETAILED DESCRIPTION

Figure 1:
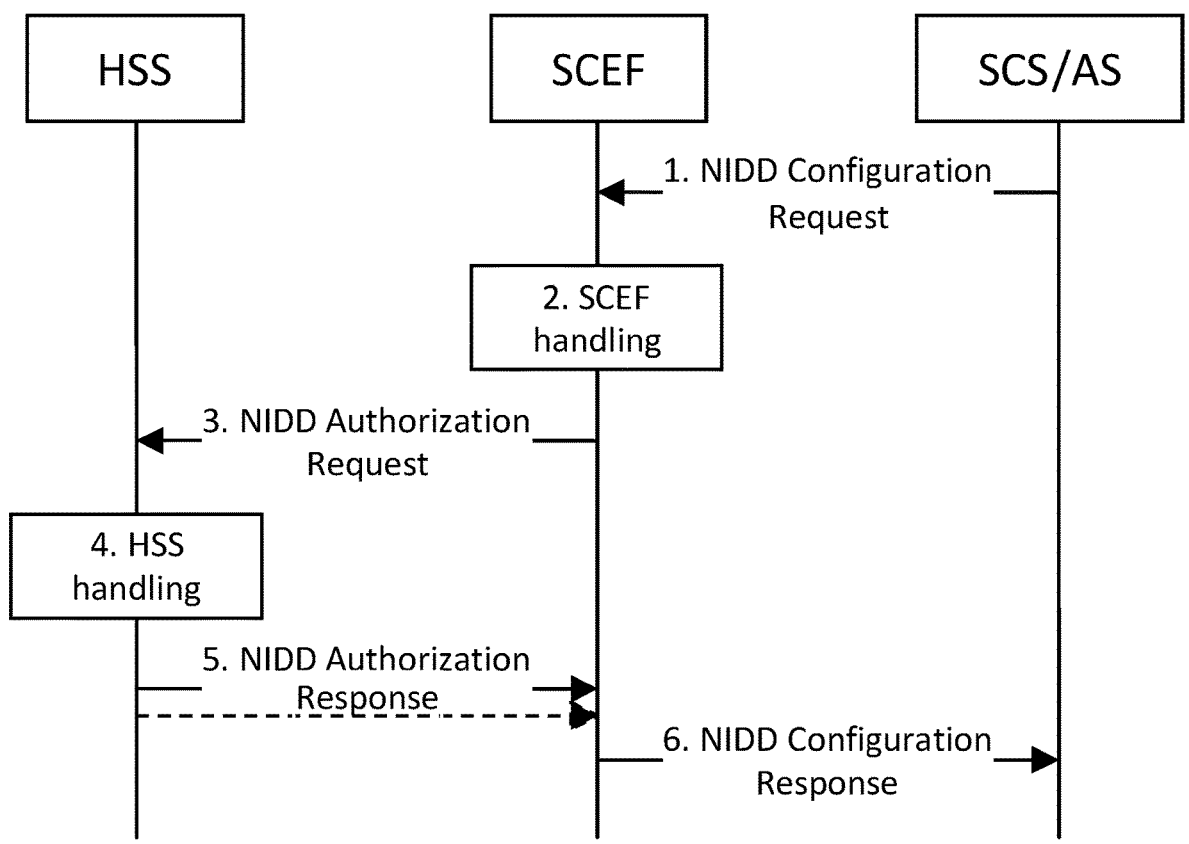
FIG. 1 is an exemplary procedure diagram for NIDD Configuration.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", or "communication network/system" refers to a network/system following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "entity", "network entity", "network function" may refer to a network device/apparatus/node with accessing capability in a communication network via which a terminal device accesses to the network and receives services therefrom. The entity/function may include a base station (BS), an access point (AP), a multi-cell/multicast coordination entity (MCE), a server node/function (such as a service capability server/application server, SCS/AS, group communication service application server, GCS AS, application function, AF), an exposure node (such as a service capability exposure function, SCEF, network exposure function, NEF), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto node, a pico node, and so forth.

Yet further examples of the network function/entity comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term terminal device encompasses a device which is able to communicate with a network function/node such as a base station, or with another wireless device by transmitting and/or receiving wireless signals. Thus, the term terminal device encompasses, but is not limited to: a mobile phone, a stationary or mobile wireless device for machineto-machine communication, an integrated or embedded wireless card, an externally plugged in wireless card, a vehicle, etc.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a user equipment, UE, implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 is an exemplary procedure diagram for NIDD Configuration.

Figure 5:
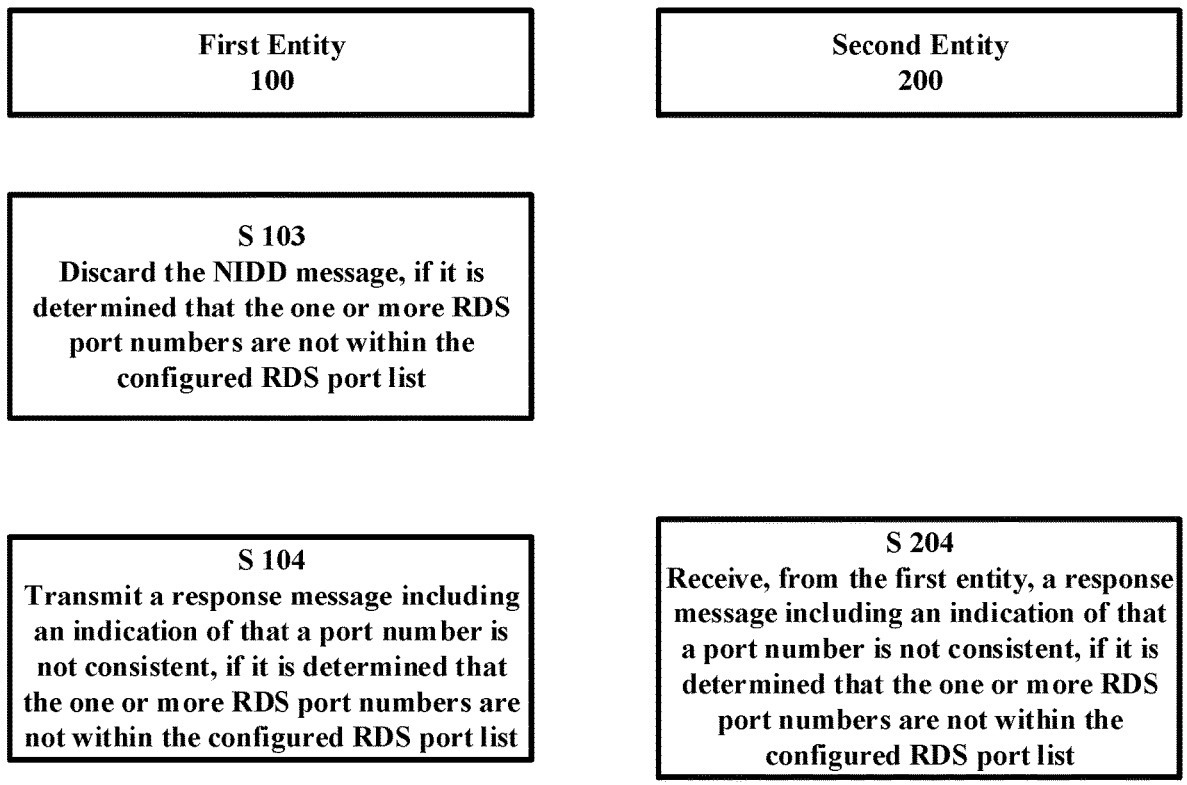
FIG. 5 is an exemplary flow chart showing additional steps of methods shown in FIG. 2.

FIG. 1 is the same as the "FIG. 5.13.2-1: Configuration for NIDD procedure in 3GPP TS 23.682 V16.4.0" (see clause 5.13.2 of 3GPP TS 23.682 V16.4.0, which is incorporated herein by reference in its entirety, for more details). This configuration procedure shown in FIG. 1 is applicable for both of a single UE and a group of UEs. See clause 5.13.2 of 3GPP TS 23.682 V16.4.0, in step 1, the SCS/AS sends an NIDD Configuration Request message to the SCEF. In step 2, if the Requested Action is set to "Cancel" it indicates the purpose of the request is to cancel the transaction identified by TLTRI (T8 Long Term Transaction Reference ID) and the flow proceeds to step 6. If the Requested Action is set to "Update", the purpose of the transaction is to update the parameters associated with the configuration. In step 3, the SCEF sends an NIDD Authorization Request (External Group Identifier, External Identifier or MSISDN, APN, MTC Provider Information) message to the HSS (Home Subscriber Server) to authorize the NIDD configuration request for the UEs that belongs to the External Group Identifier, received External Identifier or MSISDN, and to receive necessary information for NIDD, if required. In step 4, the HS S examines the NIDD Authorization Request message, e.g. with regards to the existence of External Group Identifier, External Identifier or MSISDN. In step 5, the HSS sends an NIDD Authorization Response (with single value or list of (IMSI and MSISDN or External Identifier), Result) message to the SCEF to acknowledge acceptance of the NIDD Authorization Request. In step 6, the SCEF sends an NIDD Configuration Response (TLTRI, Maximum Packet Size, Reliable Data Service Indication, and Cause) message to the SC S/AS to acknowledge acceptance of the NIDD Configuration Request and the deletion of the identified NIDD configuration, if it was requested.

In such a NIDD configuration procedure, the SCS/AS may send a list of RDS ports in the RDS configuration. These ports will be used in later non-IP data transmission.

The static RDS port information may be sent via NIDD configuration as shown in FIG. 1. Alternatively, a dynamic RDS port management procedure is introduced between the UE and the SCEF (see 3GPP TS 24.250 V16.1.0, which is incorporated herein by reference in its entirety), the SCS/AS can dynamically negotiate with the UE (via SCEF) regarding the RDS port reservation/release.

However, the SCEF does not verify the RDS port received, i.e. whether it is aligned with subsequently received MO/MT non-IP data.

Then it is possible that the RDS port included in the MO/MT NIDD was not set/configured via the previous NIDD configuration. If there is a mismatch, for MO NIDD, the MO data may be silently discarded by the SCEF if received from the UE; for MT NIDD, the MT data may be transferred to UE but is silently discarded by the UE due to unknown RDS port (i.e. unknown application).

Therefore, the undesired data, such as the MT NIDD with mismatched port information, are still transferred, thereby wasting communication resource and causing undesired, unpredictable actions in the communication network.

Figure 2:
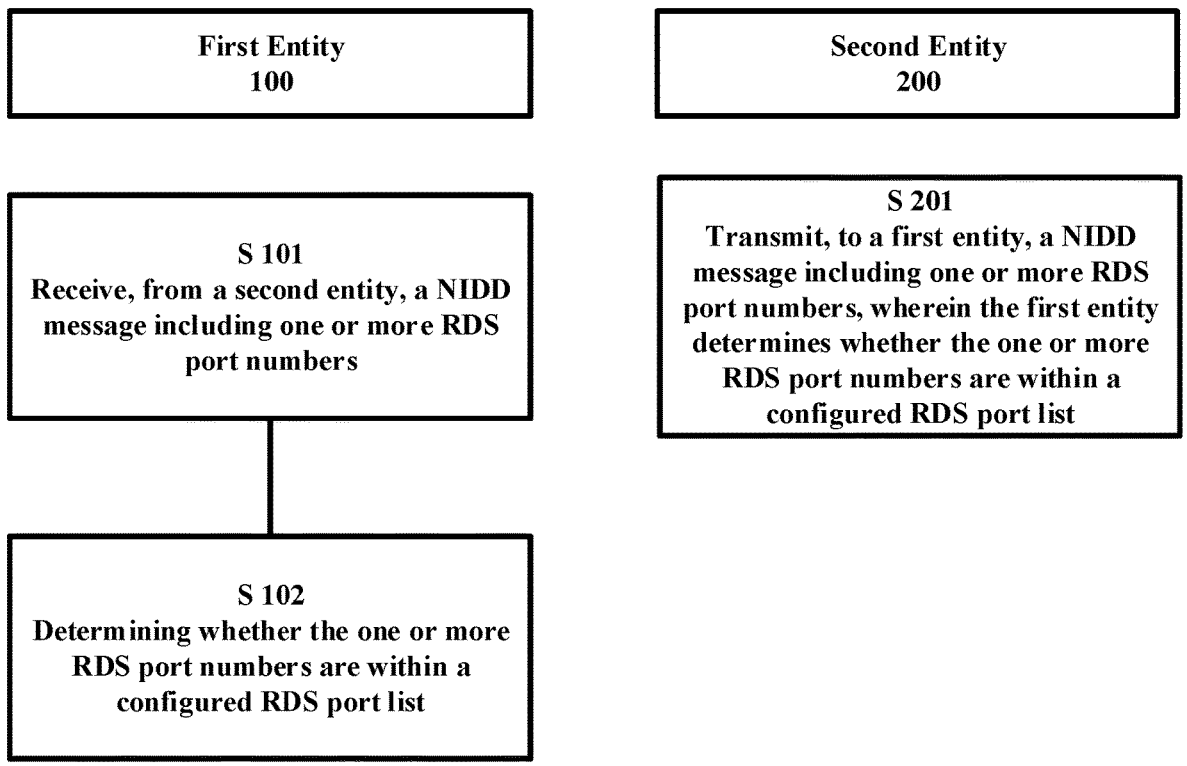
FIG. 2 is an exemplary flow chart showing methods according to embodiments of the present disclosure.

FIG. 2 is an exemplary flow chart showing methods according to embodiments of the present disclosure.

As shown in FIG. 2, a method performed at a first entity 100 may comprise: step S101, receiving, from a second entity, a non-internet protocol data delivery, NIDD, message including a port number, particularly one or more RDS port numbers; and step S102, determining whether the one or more RDS port numbers are consistent with a NIDD configuration. Particularly, the NIDD configuration may comprise a configured RDS port list. It may be determined that whether the one or more RDS port numbers are within the configured RDS port list.

In embodiments of the present disclosure, the first entity 100 may comprise any entity capable of receiving NIDD data during NIDD procedures in the communication system. For example, the first entity 100 may comprise a SCEF as shown in FIG. 1, or network exposure function, NEF, in a fifth generation (5G) communication system.

A method performed at a second entity 200 may comprise: step S201, transmitting, to a first entity, a NIDD message including a port number (e.g. one or more RDS port numbers). The first entity determines whether the port number is consistent with a NIDD configuration (e.g., whether the one or more RDS port numbers are within a configured RDS port list).

In embodiments of the present disclosure, the second entity 200 may comprise any entity capable of transmitting NIDD data during NIDD procedures in the communication system. For example, the second entity 100 may comprise a SCS/AS shown in FIG. 1, an application function, AF, in a 5G system, or a terminal device, such as any UE.

According to embodiments of the present disclosure, the first entity 100 may check the port consistency between any received NIDD message and NIDD configuration. Thus, network resources for transmitting the invalid NIDD data may be saved, and undesired actions in the communication system may be avoided.

FIG. 3 is an exemplary diagram showing address and control field format for a NIDD message. FIG. 3 is the same as the "FIG. 5.2.1-1: Address and Control field format" from 3GPP TS 24.250, V16.1.0. I frame may be for confirmed information transfer; S frame may be for supervisory functions; UI frame may be for unconfirmed information transfer; and U frame may be for control functions. The description of the bits in the FIG. 3 may be as follows: A is for Acknowledgement request bit; Mn is for Unnumbered function bit; N(R) for is Receive sequence number; N(S) is for Send sequence number; N(U) is for Unconfirmed sequence number; Sn is for Supervisory function bit; Rn is for Selective acknowledgement bitmap bit; PD is for Protocol Discriminator bit; C/R is for Command/Response bit; ADS is for Address bit; Source Port is for Source port number; Destination Port is for Destination port number; and X is for Spare bit.

As shown in FIG. 3, in embodiments of the present disclosure, the port number comprises a source port number and/or a destination port number. Particularly, the port number may comprise: an RDS source port number and/or an RDS destination port number.

According to embodiments of the present disclosure, a strict policy may be applied for checking the port consistency. Namely, it will be determined that the port number is not consistent with the NIDD configuration, if any one of the source port or the destination port in the NIDD message does not equal to a configured one in the NIDD configuration.

Further, the first entity 100 may obtain the port number from the NIDD configuration and NIDD messages, based on applied standard or technical specification. For example, an exemplary table 1, as the same as the Table 5.6.2.2.2-1 in clause 5.6.2.2.2, 3GPP TS 29.122 V16.3.0, which is incorporated herein by reference in its entirety, shows a definition of the RdsPort, for the port configuration for Reliable Data Transfer.

TABLE 1

Definition of RdsPort data Type

| Attribute name | Data type | Cardinality | Description |
|---|---|---|---|
| portUE | Port | 1 | Indicates the port number on UE that is used for reliable data transfer with a specific application on UE using RDS (as defined in clause 5.2.4 and 5.2.5 of 3GPP TS 24.250 [31]). |
| portSCEF | Port | 1 | Indicates the port number on SCEF that is used for reliable data transfer with a specific application on SCEF using RDS (as defined in clause 5.2.4 and 5.2.5 of 3GPP TS 24.250 [31]). |

Further see clause 5.2.4 of 3GPP TS 24.250 V16.1.0, when a UE application starts to use the PDN connection or a PDU session to transmit RDS frames, the UE and the network establish which source port number will be used for the application on the UE side for MO traffic and which destination port number will be used for the application intended to receive the frames on the network side. Similarly for MT traffic when an application in the network starts to use the PDN connection or PDU session to transmit RDS frames, the UE and the network establish which source port number will be used for the application on the network side and which destination port number will be used for the application intended to receive the frames on the UE side.

Figure 4:
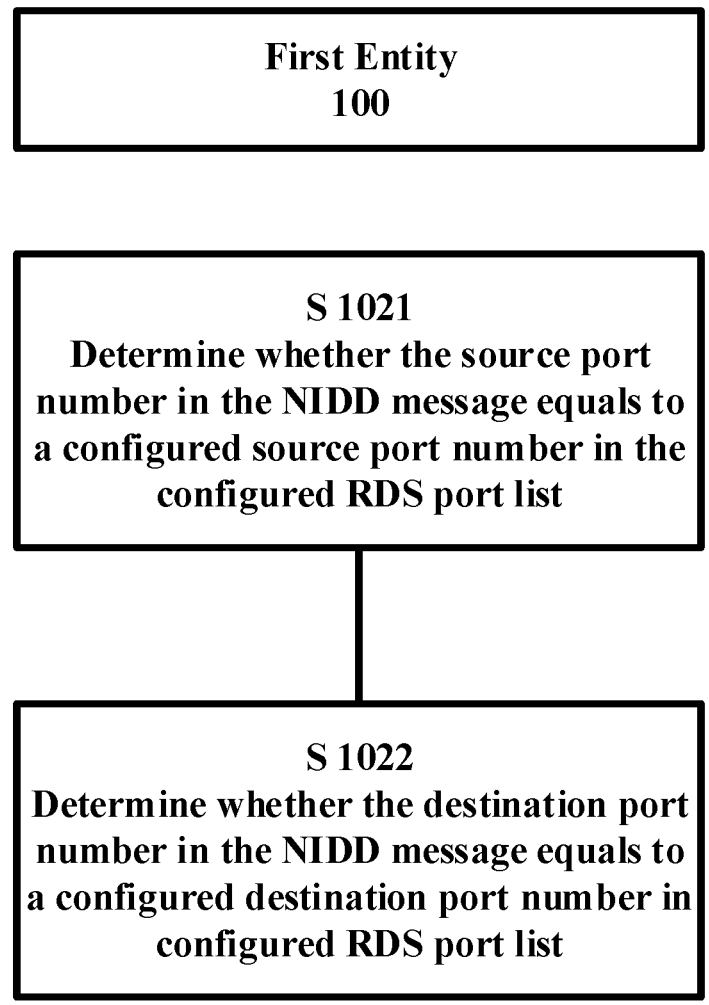
FIG. 4 is an exemplary flow chart showing sub-steps of methods shown in FIG. 2.

FIG. 4 is an exemplary flow chart showing sub-steps of methods shown in FIG. 2.

As shown in FIG. 4, the step S102, determining whether the port number is consistent with a NIDD configuration may comprise: step S1021, determining whether the source port number in the NIDD message equals to a configured source port number in the NIDD configuration (particularly in the configured RDS port list); and/or step S1022, determining whether the destination port number in the NIDD message equals to a configured destination port number in the NIDD configuration.

For example, for MT NIDD, the SCEF, upon receiving the MT NIDD message, shall check whether the received RDS destination port equals with the configured RDS port on UE and whether the received RDS source port equals with the configured RDS port on SCEF. If there is any mismatch, SCEF shall report the error.

For MO NIDD, after decoding the RDS source port and destination port from RDS I Format frame or UI Format frame as shown in FIG. 3. The SCEF shall check whether the decoded RDS destination port equals with the configured RDS port on SCEF and whether the decoded RDS source port equals with the configured RDS port on UE. If there is any mismatch, SCEF shall report the error.

FIG. 5 is an exemplary flow chart showing additional steps of methods shown in FIG. 2.

In embodiments of the present disclosure, the method performed at the first entity 100 further comprises: step S103, discarding the NIDD message, if it is determined that the port number is not consistent with the NIDD configuration.

Further, in embodiments of the present disclosure, the method performed at the first entity 100 further comprises: step S104, transmitting a response message including an indication of that the port number is not consistent (e.g., indicating that the port number is unknown), if it is determined that the port number is not consistent with the NIDD configuration.

In embodiments of the present disclosure, the method performed at the second entity 200 further comprises: step S204, receiving, from the first entity, a response message including an indication of that the port number is not consistent, if it is determined that the port number is not consistent with the NIDD configuration.

In embodiments of the present disclosure, the indication of that the port number is not consistent may comprise an error code, and a value of the port number in the NIDD message.

According to embodiments of the present disclosure, network resource for transmitting the invalid MT NIDD is saved. Further, improved NIDD service may be provided (i.e. the 3GPP network is able to notify abnormal situation to the second entity, such as a SCS/AS, or an AF).

In embodiments of the present disclosure, the response message for abnormal situation may be any kind of message/signalling, and the indication for the abnormal situation may be any kind of indicator/flag/information element.

For example, when the response message is transmitted to a Service Capability Server/Application Server, SCS/AS, or an Application Function, AF, the response message may comprise at least one of: a Mobile Terminated, MT, NIDD submit Response message; a Group MT NIDD submit Response message; a NIDD Authorisation Notification Request message; or a Mobile Originated, MO, NIDD Indication message.

Figure 6:
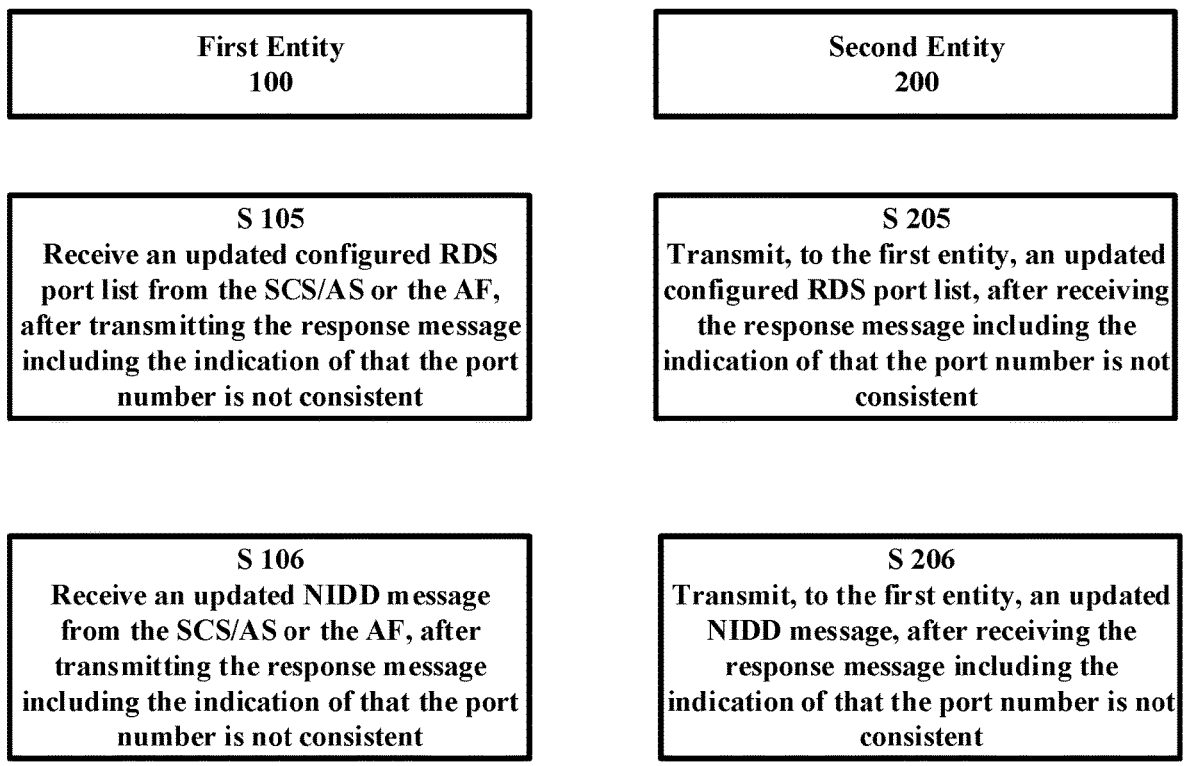
FIG. 6 is another exemplary flow chart showing additional steps of methods shown in FIG. 2.

FIG. 6 is another exemplary flow chart showing additional steps of methods shown in FIG. 2.

In embodiments of the present disclosure, the method performed at the first entity 100 further comprises: S105, receiving an updated NIDD configuration from the SCS/AS or the AF, after transmitting the response message including the indication of that the port number is not consistent; or S106, receiving an updated NIDD message from the SCS/AS or the AF, after transmitting the response message including the indication of that the port number is not consistent.

In embodiments of the present disclosure, the method performed at the second entity 200 further comprises: S205, transmitting, to the first entity, an updated NIDD configuration, after receiving the response message including the indication of that the port number is not consistent; or S206, transmitting, to the first entity, an updated NIDD message, after receiving the response message including the indication of that the port number is not consistent.

For example, the first entity 100, such as a SCEF, transmits a 'RDS port unknown' error message to the second entity 200, such as a SCS/AS, if it is determined the port number is not consistent with a NIDD configuration. Then, the second entity 200 will make as at least one of following corrective actions, after receiving the 'RDS port unknown' error message:

Re-configure the NIDD with correct RDS port information (for static RDS port configuration) or re-configure with correct RDS port information in RDS port management (for dynamic RDS port configuration);

Use correct port for further MT NIDD according to the RDS configuration;

Re-configure UE with correct RDS port (e.g. via Over The Air (OTA)).

Figure 7:
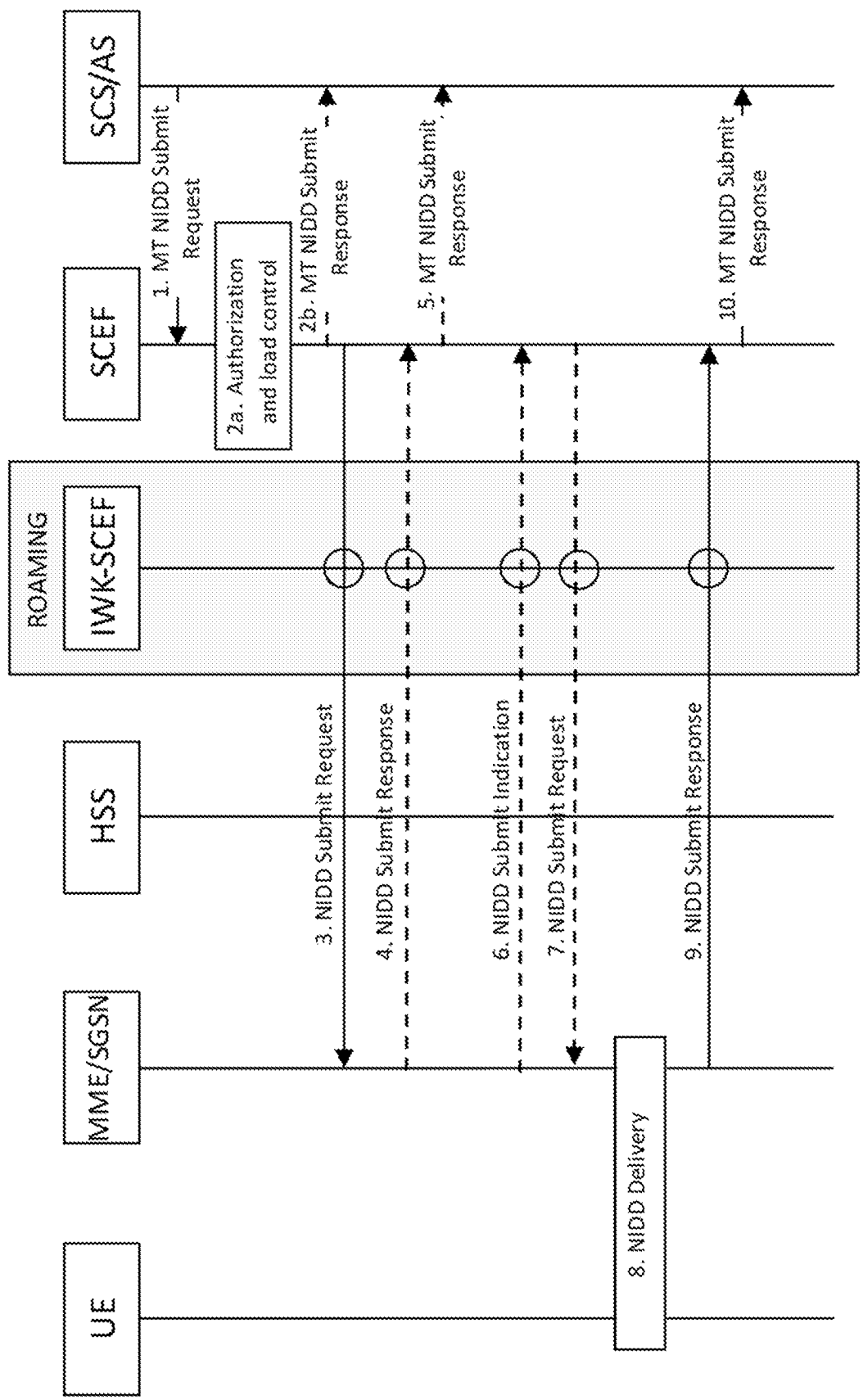
FIG. 7 is an exemplary procedure for MT NIDD for a single UE.

FIG. 7 is an exemplary procedure for MT NIDD for a single UE. FIG. 7 is the same as the "FIG. 5.13.3-1: Mobile Terminated NIDD procedure" in clause 5.13.3 of 3GPP TS 23.682 V16.4.0. See clause 5.13.3 of 3GPP TS 23.682 V16.4.0, in step 1, if SCS/AS has already activated the NIDD service for a given UE, and has downlink non-IP data to send to the UE, the SCS/AS sends a MT NIDD Submit Request (External Identifier or MSISDN, TLTRI, non-IP data, non-IP data sequence number, Reliable Data Service Configuration, Maximum Latency, Priority, PDN Connection Establishment Option) message to the SCEF. In step 2, the SCEF determines the EPS Bearer Context based on the APN associated with the NIDD configuration and the User Identity. In step 3, if an SCEF EPS bearer context corresponding to the External Identifier or MSISDN included in step 1 is found, then the SCEF sends a NIDD Submit Request (User Identity, EPS Bearer ID, SCEF ID, non-IP data, SCEF Wait Time, Maximum Re-transmission time) message toward the MME/SGSN. In step 4, if the MME/SGSN can immediately deliver the non-IP data to the UE e.g. when UE is already in ECM_CONNECTED mode, or UE is in ECM_IDLE and MME/SGSN is able to initiate paging procedure (see TS 23.401 [7]), the procedure proceeds at step 8. If the MME/SGSN is aware of the UE being temporarily unreachable, or if the MME/SGSN knows that the UE is not scheduled to be reachable within the SCEF Wait Time, while using power saving functions e.g. UE Power Saving Mode (see clause 4.5.4) or extended idle mode DRX (see clause 4.5.13), then the MME/SGSN may send a NIDD Submit Response (Cause, Requested Re-Transmission Time) message towards the SCEF. In step 5, the SCEF may send a MT NIDD Submit Response (Requested Re-Transmission time, non-IP data sequence number, Buffered Indication, Cause) to the SCS/AS informing of the received results from the MME/SGSN. In step 6, when the MME/SGSN detects that the UE is reachable (e.g. when coming out of PSM mode by performing TAU/RAU, when initiating MO communication etc.), or when the UE is about to become reachable (e.g. extended idle mode DRX cycle expiring, MME/SGSN anticipating MO communication pattern for the UE etc.), and the MME/SGSN has the Not Reachable for NIDD flag set, then the MME/SGSN sends a NIDD Submit Indication (User Identity) message towards the SCEF. In step 7, if the data has not been purged, the SCEF sends a NIDD Submit Request (User Identity, EPS Bearer ID, SCEF ID, non-IP data, SCEF Wait Time, Maximum Re-transmission time) message toward the MME/SGSN. In step 8, if required, the MME/SGSN pages the UE and delivers the non-IP data to the UE using data transfer via the MME procedure as described in clause 5.3.4B.3 of TS 23.401 [7] or the SGSN procedure as described in clauses 9.3 and 9.6 of TS 23.060 [6]. Depending on operator configuration, the MME/SGSN may generate the necessary accounting information required for charging. In step 9, if the MME/SGSN was able to initiate step 8, then the MME/SGSN sends a NIDD Submit Response (cause) message towards the SCEF acknowledging the NIDD Submit Request from SCEF received in step 3 or step 7. In step 10, the SCEF sends an MT NIDD Submit Response (Reliable Data Service Acknowledgement Indication, Hop-by-Hop Acknowledgment Indication, non-IP data sequence number, Cause).

According to embodiments of the present disclosure, the steps 2a and 2b in FIG. 7 may be improved.

For example, in 2a, if the new feature for checking port consistency is supported, the SCEF may check/verify whether the received RDS ports in the MT NIDD is recognized based on the NIDD configuration or not. If the above check fails, the SCEF shall reject the request in 2b (MT NIDD Submit Response message) with new error code, such as 'RDS PORT UNKNOWN'.

Specifically, as an exemplary improvement (underlined part) for "4.4.5.3.1 Mobile Terminated NIDD for a single UE, 3GPP TS 29.122 V16.3.0", upon receipt of a HTTP POST request from the SCS/AS for a downlink data delivery for a single UE, the SCEF shall: . . . if the Rds_port_check/verification feature is supported, check whether the RDS port numbers are configured (e.g. whether the RDS port numbers are within the configured RDS list). If the RDS port numbers are unknown in the SCEF, the SCEF shall respond a 403 Forbidden response with a cause value "RDS_PORT_UNKNOWN" in the "cause" attribute of the "ProblemDetails" structure (e.g. for indicating the RDS port is not properly configured).

Figure 8:
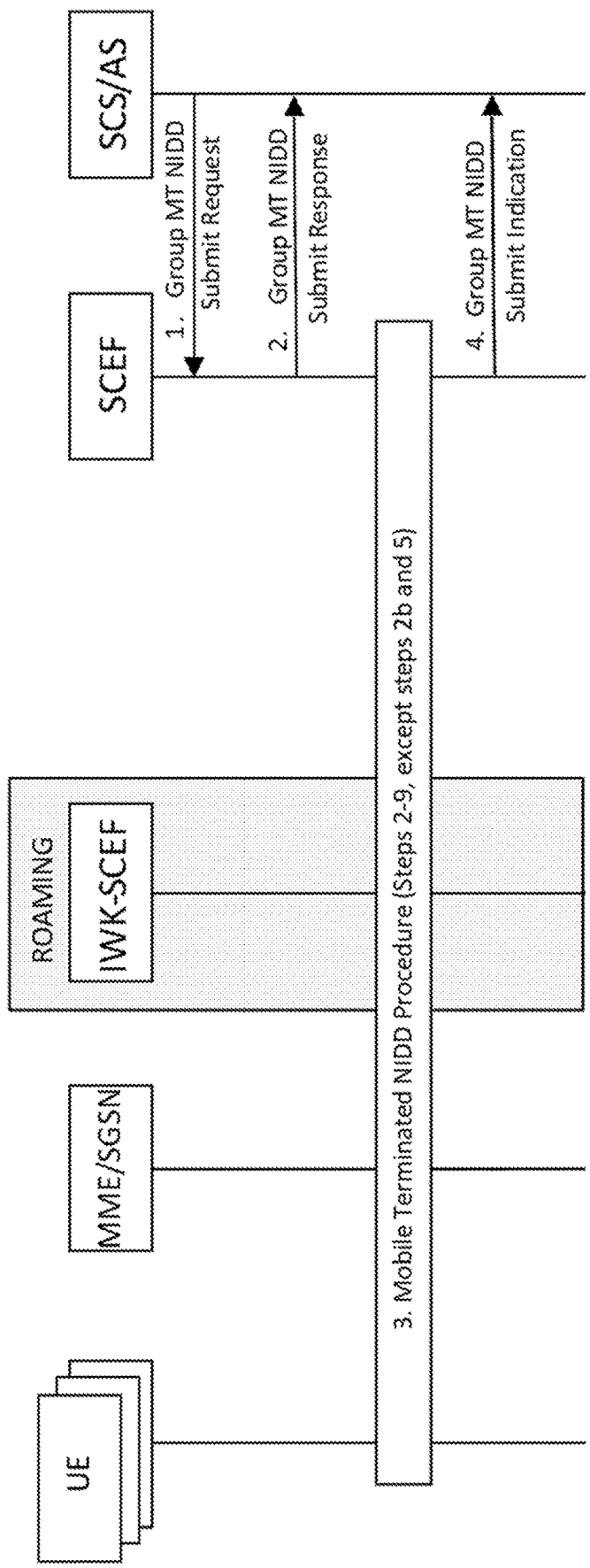
FIG. 8 is an exemplary procedure for MT NIDD for a group of UEs.

FIG. 8 is an exemplary procedure for MT NIDD for a group of UEs. FIG. 8 is the same as the "FIG. 5.5.3-1: Group Message Delivery via unicast MT NIDD" in clause 5.5.3 of 3GPP TS 23.682 V16.4.0. See clause 5.5.3 of 3GPP TS 23.682 V16.4.0, in step 1, if SCS/AS has downlink non-IP data to send to a group of UEs, the SCS/AS sends a Group MT NIDD Submit Request (SCS/AS Identifier, External Group Identifier, TLTRI, non-IP data, Reliable Data Service Configuration, Maximum Latency, PDN Connection Establishment Option) message to the SCEF. In step 2, based on the preceding NIDD Configuration of the UE Group (see clause 5.13.2) and the SCEF stored list of authorized External Identifiers associated to the External Group Identifier, the SCEF sends a single Group MT NIDD Submit Response (Cause) message to the SCS/AS to acknowledge acceptance of the Group MT NIDD Submit Request. In step 3, the SCEF performs this step for each External Identifier that belongs to the External Group Identifier. The SCEF stored the list of authorized External Identifiers associated to the External Group Identifier during the preceding NIDD Configuration of the UE Group (see clause 5.13.2). In step 4, after executing step 3 for all UEs, the SCEF sends an aggregated response message Group MT NIDD Submit Indication (TLTRI associated with the Request of step 1, Hop-by-Hop Acknowledgment Indication(s), Re-Transmission time(s), Trigger Indication(s), Cause(s)).

According to embodiments of the present disclosure, the step 2 in FIG. 8 may be improved.

For example, after checking the RDS ports in the Group MT NIDD submit request and if the SCEF doesn't know the RDS ports (if the new feature is supported), the SCEF needs to reject the request with new error code 'RDS PORT UNKNOWN' in step 2 (Group MT NIDD Submit Response message).

Specifically, as an exemplary improvement (underlined part) for "4.4.5.3.2 Mobile Terminated NIDD for a group of UEs, 3GPP TS 29.122 V16.3.0", upon receipt of such an HTTP POST request from the SCS/AS requesting the group message delivery, the SCEF checks whether the SCS/AS is authorised to send NIDD requests, whether the non-IP packet size is larger than the Maximum Packet Size that was provided to the SCS/AS during NIDD Configuration and if the Rds_port_check feature is supported whether the RDS port numbers are recognized.

Figure 9:
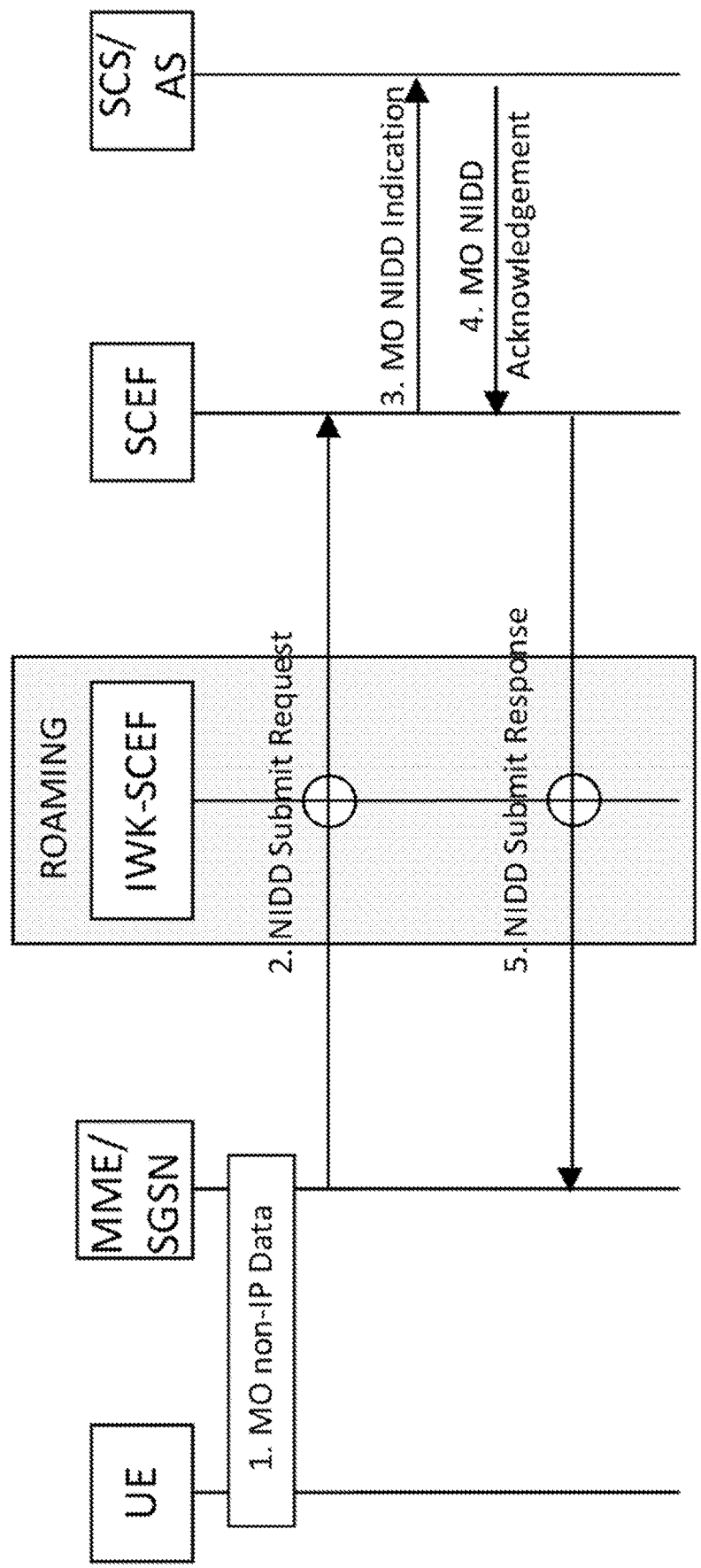
FIG. 9 is an exemplary procedure for Mobile Originated NIDD procedure.

FIG. 9 is an exemplary procedure for Mobile Originated NIDD procedure. FIG. 9 is the same as the "FIG. 5.13.4-1: Mobile Originated NIDD procedure" in clause 5.13.4 of 3GPP TS 23.682 V16.4.0. See clause 5.13.4 of 3GPP TS 23.682 V16.4.0, in step 1, the UE sends a NAS message with EPS bearer ID and non-IP data, the Reliable Data Service header is included if the Reliable data service is enabled, to the MME as per the procedure described in clause 5.3.4B.2 of TS 23.401 [7] (steps 0-2) 2) or the UE sends data to the SGSN (see clause 9.3 and 9.6 of TS 23.060 [6]) on a PDP Context of PDN type Non-IP associated with a T6b interface. In step 2, the MME/SGSN sends NIDD Submit Request (User Identity, EBI, SCEF ID, non-IP data, MO Exception data counter) message to the SCEF. In the roaming case, the MME/SGSN sends the message to the IWK-SCEF which forwards the message to the SCEF over T7. In step 3, when the SCEF receives the non-IP data on the T6a/T6b (or T7) interface, and finds an SCEF EPS bearer context and the related T8 Destination Address, then it sends the non-IP data to the SCS/AS that is identified by the T8 Destination address in a MO NIDD Indication (External Identifier or MSISDN, non-IP data, TLTRI, Reliable Data Service Configuration). In step 4, the SCS/AS responds to the SCEF with a MO NIDD Acknowledgement (Cause). In step 5, the SCEF sends NIDD Submit Response to MME/SGSN.

According to embodiments of the present disclosure, the procedure between step 2 and step 3 in MO NIDD in FIG. 9 may be improved.

For example, if the new feature is supported, the SCEF shall check whether the RDS ports in the MO non-IP data is recognized or not.

If it is not recognized, the SCEF shall notify all SCS/AS in step 3 (MO NIDD message). Alternatively, the SCEF may trigger the NIDD authorization notification procedure described below to notify all SCS/AS.

Figure 10:
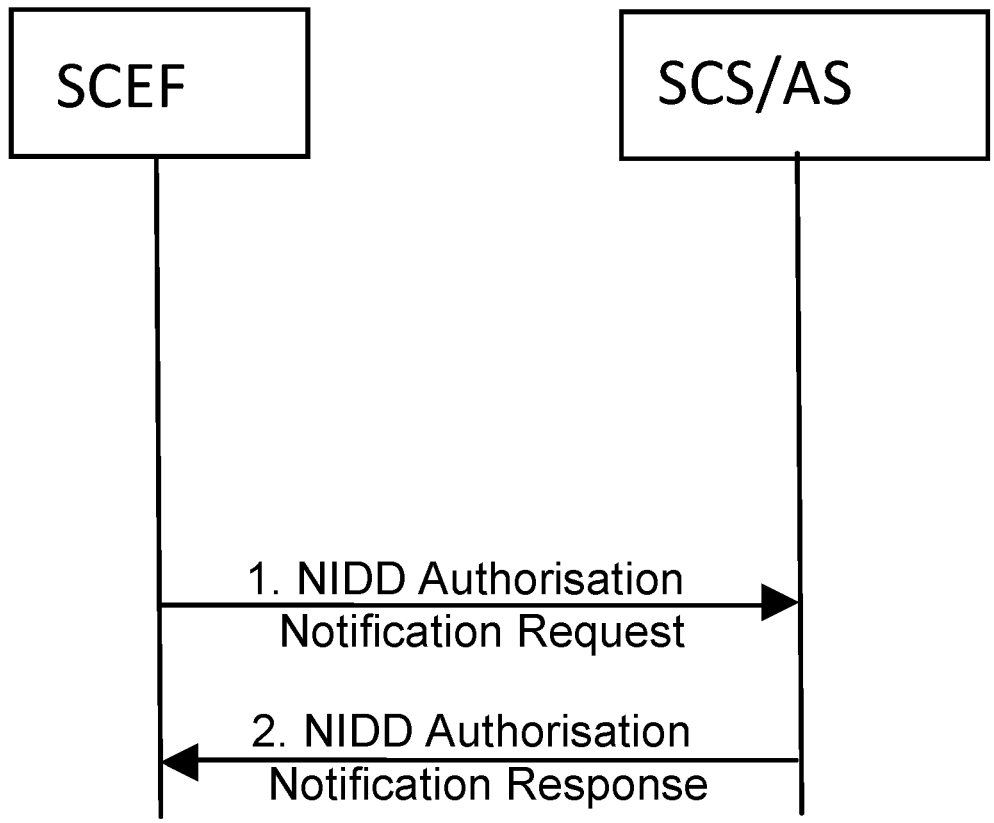
FIG. 10 is an exemplary procedure for NIDD Authorisation Update procedure.

FIG. 10 is an exemplary procedure for NIDD Authorisation Update procedure.

According to embodiments of the present disclosure, in step 1 in FIG. 10, the SCEF may initially transmit a NIDD Authorisation Notification Request with new NIDD status 'RDS PORT UNKNOWN' and the unrecognized RDS ports. In step 2, the SCEF may receive a NIDD Authorisation Notification Response from SCS/AS.

Specifically, as an improvement (underlined part) for "4.4.5.5 NIDD Authorisation Update procedure, 3GPP TS 29.122 V16.3.0", if the Rds_port_check feature is supported, before sending the MO NIDD to the SCS/AS as specified in subclause 4.4.5.4, the SCEF shall check RDS port numbers contained in (decoded from) the uplink non-IP data. If it is not within the configured RDS port list, the SCEF shall notify all SCS/AS with NIDD status set to "RDS_PORT_UNKNOWN" and the unknown (i.e. unrecognized) RDS port numbers. The SCS/AS shall acknowledge the request with an HTTP 200 OK or 204 No Content response.

Table 2 shows an exemplary improvement (underlined part) for "Table 5.6.2.1.6-1: Definition of type NiddConfigurationStatusNotification, in clause 5.6.2.1.6 in 3GPP TS 29.122 V16.3.0", according to embodiments of the present disclosure.

TABLE 2

| Attribute name | Data type | Cardinality | Description | Applicability (NOTE 1) |
|---|---|---|---|---|
| niddConfiguration | Link | 1 | Link to the NIDD configuration resource to which this notification is related. | |
| externalId | ExternalId | 0..1 | Each element uniquely identifies a user as defined in Clause 4.6.2 of 3GPP TS 23.682 [2]. (NOTE 2) | |
| msisdn | Msisdn | 0..1 | Each element identifies the MS internal PSTN/ISDN number allocated for a UE. (NOTE 2) | |
| status | NiddStatus | 1 | Indicates the NIDD configuration status. | |
| rdsCapIndication | boolean | 0..1 | It indicates whether the network capability for the reliable data service is enabled or not. | |

TABLE 2-continued

Definition of type NiddConfigurationStatusNotification

| Attribute name | Data type | Cardi- nality | Description | Applicability (NOTE 1) |
|---|---|---|---|---|
| rdsPort | Rds- Port | 0..1 | Indicates the port configuration that is used for reliable data transfer between specific applications using RDS (as defined in clause 5.2.4 and 5.2.5 of 3GPP TS 24.250 [31]). | Rds_port_ check (or Rds_port_ verification) |

NOTE 1:
Properties marked with a feature as defined in subclause 5.6.4 are applicable as described in subclause 5.2.7. If no feature are indicated, the related property applies for all the features.
NOTE 2:
One of the properties "externalId" or "msisdn" shall be included.

Table 3 shows an exemplary improvement (underlined part) for "Table 5.6.2.3.5-1: Enumeration NiddStatus, in clause 5.6.2.3.5 in 3GPP TS 29.122 V16.3.0", according to embodiments of the present disclosure.

TABLE 3

Enumeration NiddStatus

| Enumeration value | Description | Applicability (NOTE) |
|---|---|---|
| ACTIVE | The NIDD configuration is active. | |
| TERMINATED_ UE_NOT_ AUTHORIZED | The NIDD configuration was terminated because the UE's authorisation was revoked. | |
| TERMINATED | The NIDD configuration was terminated. | |
| RDS_PORT_ UNKNOWN | The SCEF does not know the RDS port numbers in the NIDD, such port numbers does not match with the configured port numbers. (or, the RDS port is unknown) | Rds_port_ check |

NOTE:
Properties marked with a feature as defined in subclause 5.6.4 are applicable as described in subclause 5.2.7. If no feature are indicated, the related property applies for all the features.

Table 4 shows an exemplary improvement (underlined part) for "Table 5.6.5.3-1: Application errors, in clause 5.6.5.3 in 3GPP TS 29.122 V16.3.0", according to embodiments of the present disclosure.

TABLE 4

Application errors

| Application Error | HTTP status code | Description | Appli- cability |
|---|---|---|---|
| QUOTA_ EXCEEDED | 403 Forbidden | Not enough quota for the MT NIDD | |
| DATA_TOO_ LARGE | 403 Forbidden | The non-IP data size is larger than "maximumPacketSize" of the NIDD configuration. | |
| RDS_PORT_ UNKNOWN | 403 Forbidden | The SCEF does not know the RDS port numbers in the MT NIDD, such port numbers does not match with the configured port numbers. | Rds_ port_ check |
| OPERATION_ PROHIBIT- TED | 403 Forbidden | Indicates the operation is prohibitted. | |
| ALREADY_ DELIVERED | 404 Not Found | The SCEF has already delivered the buffered data. | |
| SENDING | 409 Conflict | The SCEF is ready in sending the buffered non-IP data. | |
| TRIGGERED | 500 Internal Server Error | The SCEF triggered the device but did not buffer the data. The SCS AS may resubmit the data | |
| TEMPOR- ARILY_ NOT_ REACHABLE | 500 Internal Server Error | The SCEF has aborted the delivery because the UE is temporarily not reachable. The SCEF may in addition indicate a requested re- submission time for the data. | |
| NEXT_HOP | 500 Internal Server Error | Unsuccessful delivery to the next hop. | |
| TIMEOUT | 500 Internal Server Error | Unsuccessful delivery due to timeout. | |

Further, an exemplary improvement (underlined part) to "A.6 NIDD API in 3GPP TS 29.122 V16.3.0" is also shown below.
( . . . text not shown for clarity . . . )

Figure 11:
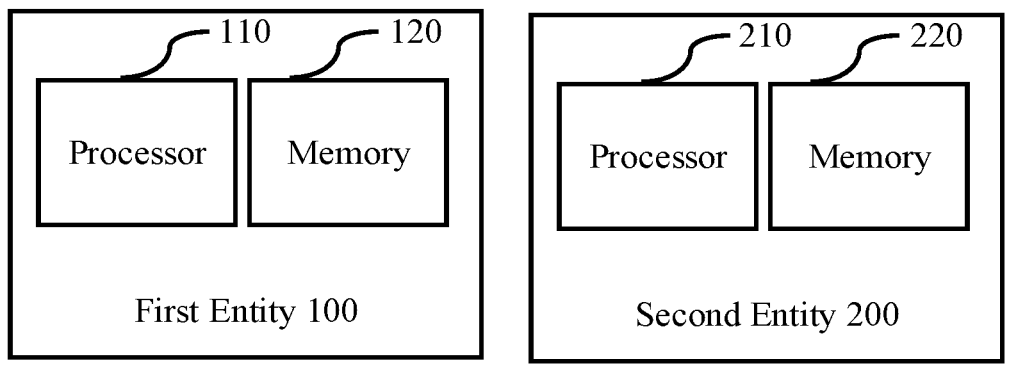
FIG. 11 is a block diagram showing apparatuses for the first and second entities, according to embodiments of the present disclosure.

FIG. 11 is a block diagram showing apparatuses for the first and second entities, according to embodiments of the present disclosure.

```
NiddConfigurationStatusNotification:
    type: object
    properties:
      niddConfiguration:
         $ref: 'TS29122_CommonData.yaml#/components/schemas/Link'
      externalId:
         $ref: 'TS29122_CommonData.yaml#/components/schemas/ExternalId'
      msisdn:
         $ref: 'TS29122_CommonData.yaml#/components/schemas/Msisdn'
      status:
         $ref: '#/components/schemas/NiddStatus'
      rdsCapIndication:
        type: boolean
        description: It indicates whether the network capability for the reliable data
service is enabled or not.
      rdsPort:
         $ref: '#/components/schemas/RdsPort'
    required:
      - niddConfiguration
      - status
    oneOf:
      - required: [externalId]
      - required: [msisdn]
(... text not shown for clarity ...)
  NiddStatus:
    anyOf:
    - type: string
      enum:
         - ACTIVE
         - TERMINATED_UE_NOT_AUTHORIZED
         - TERMINATED
         - RDS PORT UNKNOWN
    - type: string
      description: >
        This string provides forward-compatibility with future
        extensions to the enumeration but is not used to encode
        content defined in the present version of this API.
    description: >
      Possible values are
      - ACTIVE: The NIDD configuration is active.
      - TERMINATED_UE_NOT_AUTHORIZED: The NIDD configuration was terminated because
the UE's authorisation was revoked.
      - TERMINATED: The NIDD configuration was terminated.
      - RDS PORT UNKNOWN: The SCEF does not know the RDS port numbers in the NIDD,
such port numbers does not match with the configured port numbers. (The RDS port is
unknown)
    readOnly: true
  NiddConfigurationPatch:
    type: object
    properties:
      duration:
         $ref: 'TS29122_CommonData.yaml#/components/schemas/DateTimeRm'
      reliableDataService:
        type: boolean
        description: The reliable data service (as defined in subclause 4.5.15.3 of
3GPP TS 23.682) to indicate if a reliable data service acknowledgment is enabled or
not.
        nullable: true
      rdsPorts:
        type: array
        items:
           $ref: '#/components/schemas/RdsPort'
        minItems: 1
        description: Indicates the port configuration that is used for reliable data
transfer between specific applications using RDS (as defined in subclause 5.2.4 and
5.2.5 of 3GPP TS 24.250).
      pdnEstablishmentOption:
         $ref: '#/components/schemas/PdnEstablishmentOptionsRm'
```

As shown in FIG. 11, the apparatus for first entity 100 may comprise: a processor 110; and a memory 120, containing instructions executable by the processor 110. The first entity 100 is operative to: receive, from a second entity, a NIDD message including a port number; and determine whether the port number is consistent with a NIDD configuration.

In embodiments of the present disclosure, the first entity is further operative to implement any of the methods above described, such as methods shown in FIG. 1-10.

As shown in FIG. 11, the apparatus for second entity 200 may comprise: a processor 210; and a memory 220, containing instructions executable by the processor 210. The second entity 200 is operative to: transmit, to a first entity, a NIDD message including a port number. The first entity determines whether the port number is consistent with a NIDD configuration.

In embodiments of the present disclosure, the second entity is further operative to implement any of the methods above described, such as methods shown in FIG. 1-10.

The processor 110 and processor 210 may be any kind of processing component, such as one or more microprocessor or microcontrollers, as well as other digital hardware, which may include digital signal processors (DSPs), special-purpose digital logic, and the like. The memory 120 and memory 220 may be any kind of storage component, such as read-only memory (ROM), random-access memory, cache memory, flash memory devices, optical storage devices, etc.

Figure 12:
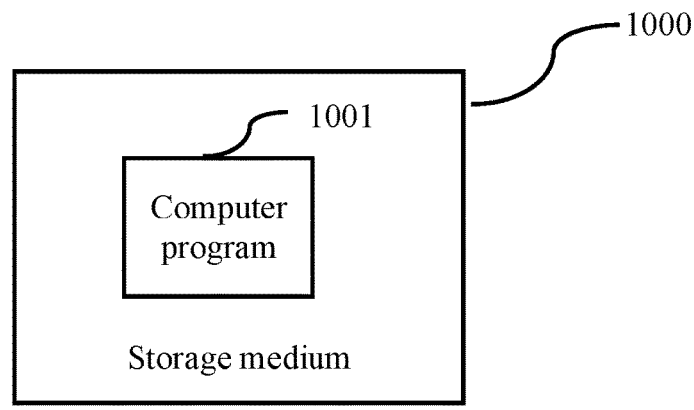
FIG. 12 is a block diagram showing a computer readable storage medium, according to embodiments of the present disclosure.

FIG. 12 is a block diagram showing a computer readable storage medium, according to embodiments of the present disclosure.

As shown in FIG. 12, a computer readable storage medium 1000 having a computer program 1001 stored thereon. The computer program 1001 is executable by an entity to cause the entity to carry out any of the methods above described, such as methods shown in FIG. 1-10.

The computer readable storage medium 1000 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

Figure 13:
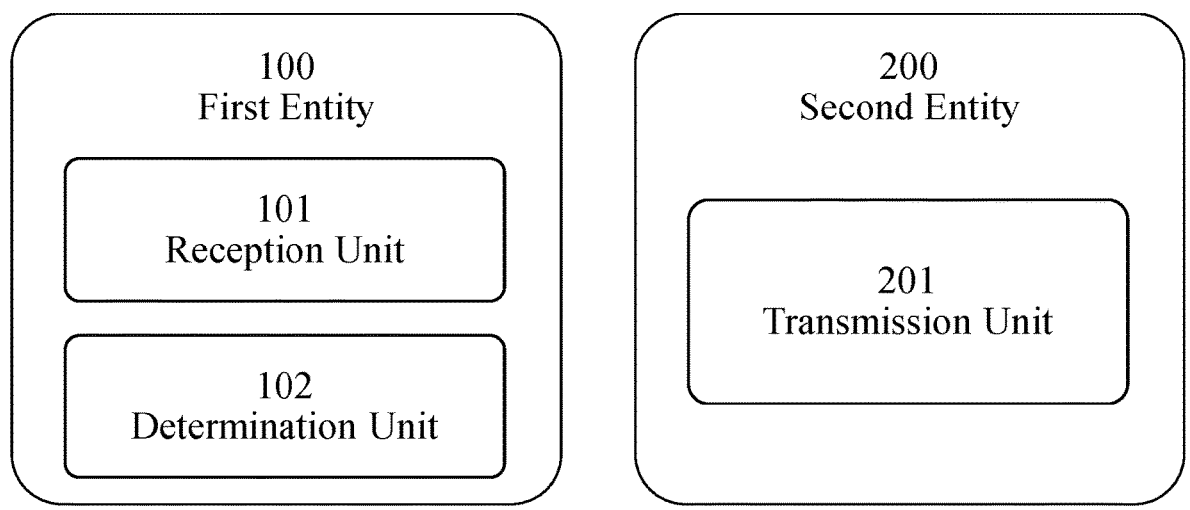
FIG. 13 is a block diagram showing function units of the apparatuses, according to embodiments of the present disclosure.

FIG. 13 is a block diagram showing function units of the apparatuses, according to embodiments of the present disclosure.

As shown in FIG. 13, the apparatus for first network entity 100 may comprise: a reception unit 101, configured to receive, from a second entity, a NIDD message including a port number; and a determination unit 102, configured to determine whether the port number is consistent with a NIDD configuration.

In embodiments of the present disclosure, the first entity 100 is further operative to implement any of the methods above described, such as methods shown in FIG. 1-10.

As shown in FIG. 13, the apparatus for second entity 200 may comprise: a transmission unit 201, configured to transmit, to a first entity, a NIDD message including a port number. The first entity determines whether the port number is consistent with a NIDD configuration.

In embodiments of the present disclosure, the second entity 200 is further operative to implement any of the methods above described, such as methods shown in FIG. 1-10.

The term unit/function unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the apparatus for the first entity 100 or second entity 200 may not need a fixed processor or memory, any computing resource and storage resource may be arranged from at least one network node/device/entity/apparatus in the communication system. The virtualization technology and network computing technology may be further introduced, so as to improve the usage efficiency of the network resources and the flexibility of the network. Particularly, these network entities, e.g. the first entity 100 or the second entity 200, may be implemented either as a network element on a dedicated hardware, as a software instance running on a dedicated hardware, or as a virtualized function instantiated on an appropriate platform, e.g. on a cloud infrastructure.

According to embodiments of the present disclosure, a new error code in the MT NIDD response indicating 'RDS port unknown' may be supported. A NIDD configuration notification to the SCS/AS notifying the 'RDS port unknown' may be supported. Such improvements are applicable for 4G with SCS/AS, SCEF, and also for 5G with the AF and NEF.

Therefore, NIDD service for the SCS/AS is improved (i.e. the 3GPP network is able to notify abnormal situation).

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A method performed at a first entity, comprising:
receiving, from a second entity, a non-internet protocol data delivery (NIDD) message comprising a first Reliable Data Service (RDS) port number; and
after receiving the NIDD message comprising the first RDS port number, determining whether the first RDS port number included in the NIDD message is within a configured RDS port list; and
as a result of determining that the first RDS port number is not within the configured RDS port list, transmitting to the second entity a response message indicating that at least one RDS port number included in the NIDD message is unknown in the first entity.

2. The method of claim 1, wherein
the first RDS port number is a source port number and determining whether the first RDS port number is within the configured RDS port list comprises determining whether the source port number in the NIDD message is equal to a configured source port number in the configured RDS port list, or
the first RDS port number is a destination port number and determining whether the first RDS port number is within the configured RDS port list comprises determining whether the destination port number in the NIDD message is equal to a configured destination port number in the configured RDS port list.

3. The method of claim 1, further comprising:
discarding the NIDD message as a result of determining that the first RDS port number is not within the configured RDS port list.

4. The method of claim 1,
wherein
the response message comprises a ProblemDetails data structure comprising a cause attribute having a value, and
the value of the cause attribute is set to RDS PORT UNKNOWN, thereby indicating that at least one RDS port number included in the NIDD message is unknown in the first entity.

5. The method of claim 4, wherein
the response message is transmitted to a Service Capability Server/Application Server (SCS/AS) or an Application Function (AF), and the response message comprises at least one of:
a Mobile Terminated (MT) NIDD submit Response message;
a Group MT NIDD submit Response message;
a NIDD Authorization Notification Request message; or
a Mobile Originated (MO) NIDD Indication message.

6. The method of claim 5, further comprising:
receiving an updated configured RDS port list from the SCS/AS or the AF, after transmitting the response message; or
receiving an updated NIDD message from the SCS/AS or the AF, after transmitting the response message.

7. The method of claim 4, wherein
the NIDD message is a Hypertext Transfer Protocol (HTTP) POST message,
the NIDD message further comprises non-IP data, and
the response message further comprises a status code set to the value 403.

8. The method of claim 1, wherein
the first entity determines whether the first RDS port number is within the configured RDS port list after determining that an RDS port verification feature is supported.

9. The method of claim 1, wherein
the first entity comprises a Service Capability Exposure Function (SCEF) or a Network Exposure Function (NEF), and
the second entity comprises a Service Capability Server/Application Server (SCS/AS), or an Application Function (AF), or a terminal device.

10. The method of claim 1, wherein the response message comprises an NIDD status set to RDS_PORT_UNKNOWN and the first RDS port number.

11. A method performed at a second entity, comprising:
transmitting, to a first entity, a non-internet protocol data delivery (NIDD) message comprising a first Reliable Data Service (RDS) port number; and
after transmitting the NIDD message to the first entity, receiving from the first entity a response message indicating that an RDS port number included in the NIDD message is not included in a configured RDS port list.

12. The method of claim 11, wherein
the first RDS port number is a source port number and the first entity is configured to determine whether the source port number is equal to a configured source port number in the configured RDS port list, or
the first RDS port number is a destination port number and the first entity is configured to determine whether the destination port number is equal to a configured destination port number in the configured RDS port list.

13. The method of claim 11, wherein the NIDD message is discarded by the first entity as a result of the first entity determining that the first RDS port number included in the NIDD message is not within the configured RDS port list.

14. The method of claim 11, wherein the response message comprises the first RDS port number.

15. The method of claim 14, wherein
the second entity comprises a Service Capability Server/Application Server (SCS/AS) or an Application Function (AF), and the response message comprises at least one of:
- a mobile terminated (MT) NIDD submit Response message;
- a Group MT NIDD submit Response message;
- a NIDD Authorization Notification Request message; or a mobile originated (MO) NIDD Indication message.

16. The method of claim 14, further comprising:
after receiving the response message, transmitting, to the first entity, an updated configured RDS port list or an updated NIDD message.

17. The method of claim 11, wherein the first entity determines whether the first RDS port number is included in the configured RDS port list, if an RDS port verification feature is supported.

18. The method of claim 11, wherein
the first entity comprises a Service Capability Exposure Function (SCEF) or a Network Exposure Function (NEF), and
the second entity comprises a terminal device.

19. An apparatus, comprising:
a receiver for receiving messages;
a processor; and
a memory, containing instructions executable by the processor, wherein the apparatus is configured to perform a method comprising:
after receiving a non-internet protocol data delivery (NIDD) message comprising a first Reliable Data Service (RDS) port number, determining whether the first RDS port number included in the NIDD message is within a configured RDS port list; and
as a result of determining that the first RDS port number is not within the configured RDS port list, transmitting a response message, responsive to the NIDD message, indicating that at least one RDS port number included in the NIDD message is unknown in the first entity.

20. The apparatus of claim 19, wherein
the response message comprises a ProblemDetails data structure comprising a cause attribute having a value, and
the value of the cause attribute is set to RDS PORT UNKNOWN, thereby indicating that at least one RDS port number included in the NIDD message is unknown in the first entity.

21. The apparatus of claim 19, wherein the response message comprises an NIDD status set to RDS_PORT_UNKNOWN and the first RDS port number.

22. An apparatus, comprising:
a processor; and
a memory, containing instructions executable by the processor, wherein the apparatus is configured to perform a method comprising:
transmitting, to a first entity, a non-internet protocol data delivery (NIDD) message comprising a first Reliable Data Service (RDS) port number; and
after transmitting the NIDD message to the first entity, receiving from the first entity a response message indicating that an RDS port number included in the NIDD message is not included in a configured RDS port list.

23. The apparatus according to claim 22, wherein the response message comprises the first RDS port number.

* * * * *

UNITED STATES PATENT AND TRADEMARK OFFICE
CERTIFICATE OF CORRECTION

PATENT NO. : 12,004,261 B2
APPLICATION NO. : 17/763581
DATED : June 4, 2024
INVENTOR(S) : Wenliang Xu Page 1 of 1

It is certified that error appears in the above-identified patent and that said Letters Patent is hereby corrected as shown below:

In the Specification

In Column 13, Line 40, delete "(steps 0-2) 2)" and insert -- (steps 0-2) --, therefor.

In Columns 15 & 16, below "TABLE 2-continued", Line 5, delete ""externalld"" and insert -- "externalId" --, therefor.

In the Claims

In Column 21, Lines 59-60, in Claim 4, delete "RDS PORT UNKNOWN," and insert -- RDS_PORT_UNKNOWN, --, therefor.

In Column 24, Lines 10-11, in Claim 20, delete "RDS PORT UNKNOWN," and insert -- RDS_PORT_UNKNOWN, --, therefor.

Signed and Sealed this
Seventeenth Day of September, 2024

Katherine Kelly Vidal
*Director of the United States Patent and Trademark Office*